United States Patent [19]
Shimizu et al.

[11] 3,719,887
[45] March 6, 1973

[54] DEVICE FOR DETECTING THE ROTATION OF WHEELS

[75] Inventors: Tetsuji Shimizu; Sohei Hibino, both of Nagoya; Haruo Miwa, Minokamo; Nobukatsu Inagaki, Nagoya, all of Japan

[73] Assignee: Kabushiki Kaisha Tokai Rika Denki Seisakusho, Nishi, Kasugai-gan, Aichi Pre., Japan

[22] Filed: March 10, 1970

[21] Appl. No.: 18,041

[30] Foreign Application Priority Data

March 13, 1969 Japan .................................. 44/21873

[52] U.S. Cl. .................... 324/171, 335/206, 335/207
[51] Int. Cl. .............................................. G01p 3/48
[58] Field of Search ...... 324/161, 162, 168, 169, 171; 200/61.13, 61.15, 61.17; 335/206, 207; 235/92 D; 33/1 PT, 125 R, 125 M, 14 R, 141 M; 340/263, 271; 73/228, 230, 231

[56] References Cited

UNITED STATES PATENTS

| | | | |
|---|---|---|---|
| 3,437,926 | 4/1969 | Spaulding | 324/171 |
| 3,477,022 | 11/1969 | Le Masters | 324/171 |
| 3,477,047 | 11/1969 | Jeffery | 335/206 |
| 2,922,994 | 1/1960 | Kennedy | 335/206 |
| 3,497,682 | 2/1970 | Haller | 235/92 MP |
| 3,543,200 | 11/1970 | Hill | 335/206 |

FOREIGN PATENTS OR APPLICATIONS

| | | | |
|---|---|---|---|
| 1,159,416 | 7/1969 | Great Britain | 324/168 |
| 907,509 | 10/1962 | Great Britain | 324/171 |
| 1,116,673 | 6/1968 | Great Britain | 335/207 |

*Primary Examiner*—Michael J. Lynch
*Attorney*—Woodhams, Blanchard & Flynn

[57] ABSTRACT

A vehicular driving speed detecting device which comprises a stator having R reed switches connected in parallel, wherein R represents an integer of two or more, at the interval of a central angle of $(2\pi/n)(1 + KR)$ radians wherein K represents zero or a natural number of $(n/R - 1)$ or less, and a rotor rotatably inserted in said stator and having $n/R$ magnets near the periphery thereof at the interval of a central angle of $(2\pi R)/n$, one of said magnets being adapted to keep, by an angle of rotation $\gamma$ defined by the formula $0 < \gamma < (2\pi/n)$, one reed switch in operating condition, thereby enabling the number of pulses $n$ obtained by one rotation of the rotor to be six or more.

6 Claims, 11 Drawing Figures

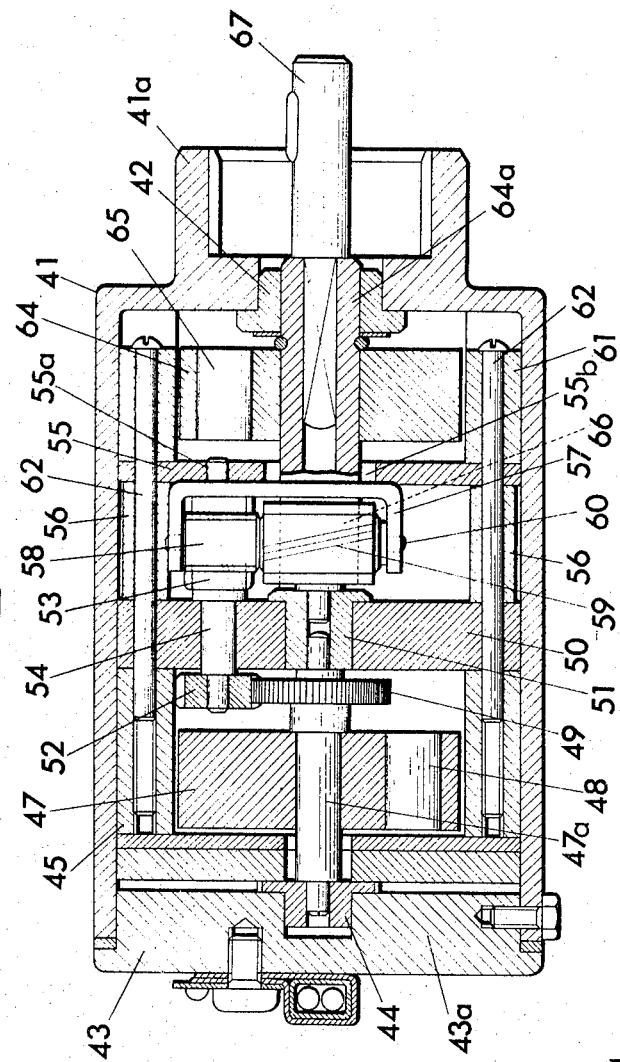
Fig. 8
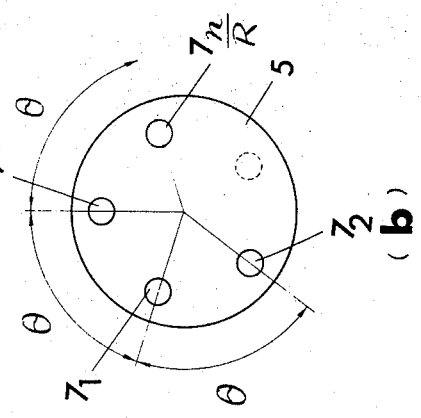
Fig. 1(a)
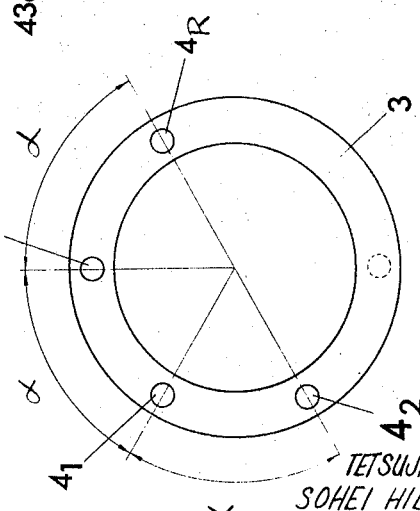
(b)
INVENTORS
TETSUJI SHIMIZU
SOHEI HIBINO
HARUO MIWA
NOBUKATSU INAGAKI
BY Woodhams, Blanchard & Flynn
ATTORNEYS

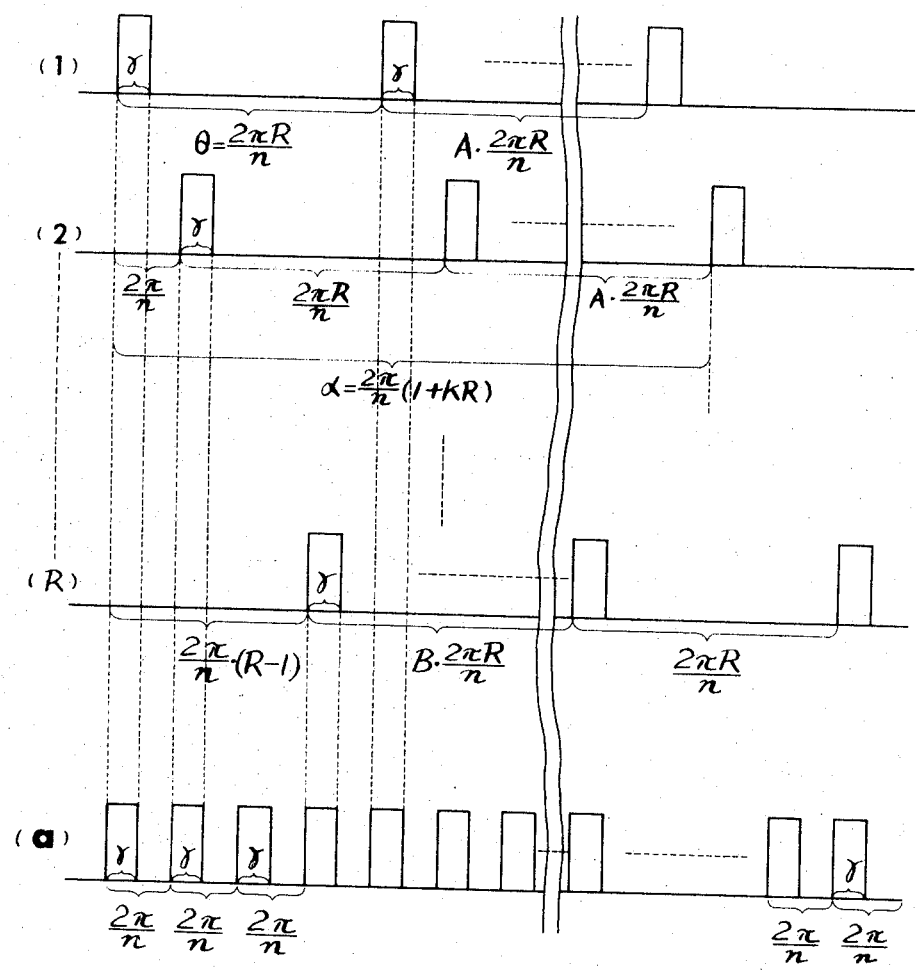

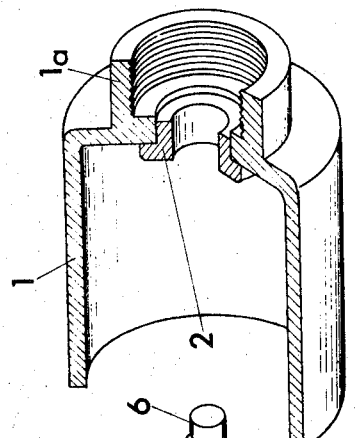

INVENTORS
TETSUJI SHIMIZU
SOHEI HIBINO
HARUO MIWA
NOBUKATSU INAGAKI

BY
ATTORNEYS

DEVICE FOR DETECTING THE ROTATION OF WHEELS

This invention relates to a device for detecting the rotation of wheels, e.g., automobile wheels, and more particularly to a device for detecting the rotation of vehicular wheels, which is applicable to the measurement of driving speed and/or driving distance.

Among conventional devices for measuring a driving speed, i.e., rotation frequency, are those of electromagnetic induction type (wherein induction voltage is obtained by causing the magnetic reluctance of AC or DC generator to change in proportion to rotation frequency) and those of photoelectric type. The electromagnetic induction type device has good durability even under unfavorable conditions. In case such type device is designed small, however, its output voltage obtained at a low frequency rotation is too low to make an exact indication of speed. As for the photoelectric type device, dirt and stain often cause the contrast and the sensibility of the photoelectric converter (CdS; phototransistors or the like) to diminish. Moreover, possible breakage or disconnection of the projecting lamp used as a light source causes trouble in checking and maintenance. In the conventional autometers capable of indicating both an integrated distance or milage and a driving speed, the meter provided in front of the driver's seat is connected to the transmission only through the medium of a flexible wire, so that revolutions proportional to those of the wheel are mechanically transmitted to control the milage indicator and, at the same time the revolutions are transmitted to an eddy current meter to control the speed meter. In such a milage and speed indicating meter as controlled by rotation of the flexible wire, there are such disadvantages that much consideration is required in designing an automobile structure for making a space enough to arrange said flexible wire and moreover, because the flexible wire rotates at a considerable high frequency within a tube which is put bendedly in the automobile thereby to cause a frictional force, bending stress and torsional stress which will simultaneously act on said wire, the flexible wire and is often subject to abrasion or breakage, leading to need of troublesome replacement of the flexible wire.

It is therefore an object of the present invention to provide a device for detecting the rotation of wheels for use in an autometer capable of indicating a driving speed and/or a driving distance, which enables the autometer to make an exact indication of the speed and/or distance.

It is another object of the present invention to provide a device for detecting the rotation of wheels of the character described, which is durable and free from causing the troubles which inevitably accompany the conventional autometer.

It is a further object of the present invention to provide a device for detecting the rotation of wheels of the kind as described, which is simple in structure, compact and can be manufactured and sold at reasonable cost.

Essentially, according to the present invention, there is provided a device for detecting the rotation of wheels which comprises a stator having a reed switch and rotor connected to an output rotary shaft for transmitting a wheel rotation, rotatably inserted in said stator and having a magnet near the periphery thereof, said magnet being adapted to effect the make-and-break operation of said reed switch according to the rotation of said rotor to produce pulses, thereby detecting the wheel rotation to indicate a driving speed and/or driving distance of an automobile.

The foregoing and other objects, features and advantages of this invention will be made apparent by the detailed descriptions of the preferred embodiments of this invention taken in conjunction with the accompanying drawings in which:

FIGS. 1–5 show a vehicular driving speed detecting device which is one embodiment of this invention, FIGS. 7–8 show a vehicular driving speed and driving distance detecting device which is a still another embodiment of this invention.

FIG. 1 is a diagrammatic view explaining the correlationship between magnets and reed switches, in which (a) shows the positions of magnets in a rotor and (b) shows the positions of reed switches in a stator;

FIG. 2 is a diagram showing wave-forms of pulses produced by said reed switches, in which (1),(2) . . . and (R) respectively show wave-forms of pulses produced by the make-and-break operations of the respective reed switch and (a) shows a wave-form of pulses produced by the make-and-break operations of said reed switches during one revolution of the rotor;

FIG. 3 is a partly cut-away exploded perspective view of the driving speed detecting device;

FIG. 4 is a vertical sectional view of the embodiment obtained by calculation, showing the assembled stator thereof;

Figure 7:
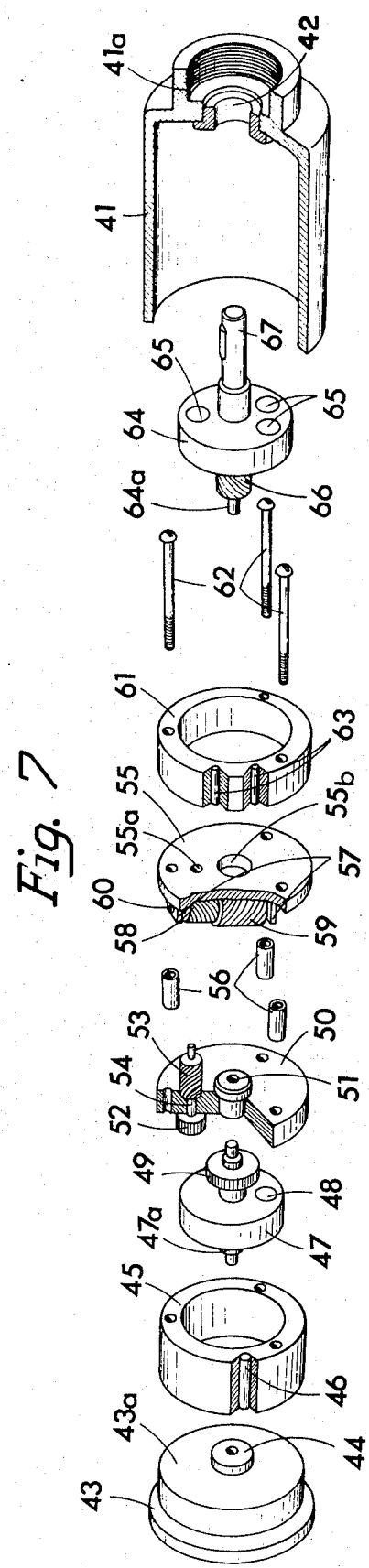
Figure 6:
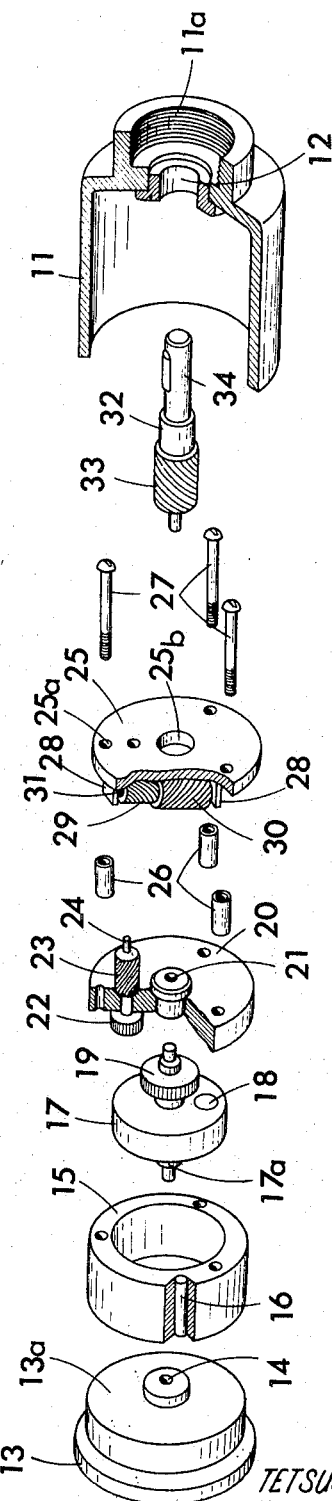
FIG. 6 shows a vehicular driving distance detecting device which is another embodiment of this invention.

FIG. 5 (a), (b) shows a diagrammatic views of magnetic flux distribution of magnets provided in the rotor;

FIG. 6 is a partly cut-away exploded perspective view of the vehicular driving distance detecting device;

FIG. 7 is a partly cut-away exploded perspective view of the driving speed and driving distance detecting device; and FIG. 8 is a longitudinal sectional view of the device of FIG. 7 in its assembled state.

Referring now to FIGS. 1 to 5, there is illustrated a vehicular driving speed detecting device which comprises a stator having R pieces of reed switches, connected in parallel, wherein R represents an integer of two or more, at the interval of a central angle of $(2\pi/n)(1 + KR)$ radian wherein K represents zero or a natural number of $(A - 1/R)$ or less and a rotor rotatably inserted in said stator and having $n/R$ pieces of magnets near the periphery thereof at the interval of a central angle of $(2\pi R)/n$, one of said magnets being adapted to move by an angle of rotation $\gamma$ defined by the formula $0 < \gamma < (2\pi)/n$ from a reed switch operating position to the subsequent reed switch operating position, thereby enabling the number of pulses obtained by one rotation of the rotor $n$ to be six or more to obviate the unfavorable vibration of a needle pointer of DC a ammeter.

1 is a cylindrical housing which has at its one end an opening and, at the other end, a projecting pipe 1a to receive an output rotary shaft for transmitting rotation of a vehicular wheel. A bearing 2 is fitted to the base portion of this projecting pipe 1a. 3 is a cylindrical stator inserted in the housing 1 and having two reed switches 4 and 4₁ provided therein at the interval of a central angle of 180° in FIG. 3. The reed switches, as illustrated in FIG. 4, include a pair of relatively movable reed members 4A and 4B which extend in the axial direction of the stator 3.

5 is a rotor having a shaft 6 piercing therethrough and three rod like magnets 7, 7₁ and 7₂ provided therein each at the interval of a central angle of 120° in FIG. 3. This rotor 5 is inserted in said stator 3 with a little spacing therebetween.

8 is a cover member which has a bearing 9 inserted in its central portion and the cover engages within the end opening of the housing 1. The shaft 6 of the rotor 5 is inserted in the bearing 9 and the cover member 8 and the bearing 2 of the housing 1.

When the rotor 5 rotates according to the rotation of a wheel, the magnets 7, 7₁ and 7₂ provided in the rotor 5 cause make-and-break operations of said reed switches 4 and 4₁. These make-and-break operations of the switches produce rectangular pulses. Said pulses are differentiated in an electrical circuit (not shown) and applied to a movable coil type DC ammeter. The differential wave-form is integrated by the inertia of said ammeter to indicate a driving speed.

A method of calculation for determining the positions in which the magnets and the reed switches are to be set is given in the following.

Now, the meanings of the symbols are shown hereunder:

$n$ : the number of pulses produced by one rotation of the rotor $R$ : the number of reed switches $K$ : zero or a natural number of $(n/R-1)$ or less, $\alpha$: a central angle formed by adjacent two reed switches mounted on the stator, and $\gamma$: an angle of rotation by which one magnet on the rotor keeps operating a reed switch.

When $n/R$ pieces of magnets 7, 7₁ ... and 7 $n/R$ are, as shown in FIG. 1 (a), provided in the rotor 5 at the interval of a central angle of $\theta = (2\pi R)/n$ radian and R pieces of reed switches 4, 4₁ ... and 4R are, as shown in FIG. 1 (b), provided in the stator 3 at the interval of a central angle of $$\alpha = \frac{2\pi}{n} + K\frac{2\pi R}{n} = \frac{2\pi}{n}(1+kR)$$

radian, the first reed switch 4 is closed, as shown in FIG. 2 (1), by counterclockwise rotation of the rotor, namely, the magnets 7, 7₁ ... and 7 $n/R$ The second reed switch 4₁ is closed with a lag of $(R-1)\alpha$ radian of phase behind the first reed switch as shown in FIG. 2 (R).

Then R pieces of reed switches 4, 4₁ ... and 4R are all connected in parallel, the make-and-break operations of (1) to (R) in FIG. 2 are totalled as shown in FIG. 2 (a). Since the frequency of said make-and-break operations is $2\pi/n$ radian, $n$ pulses can be obtained by one rotation of a rotor. (In FIG. 2, A and B are natural numbers).

Now, it must be that $0 < R\gamma 2\pi/n$, and $\alpha = (2\pi/n)(1+kR) < 2\pi$, so that the following is obtained.

$K < (n-1)/R$ ($K$ is zero or a natural number.)

And, assuming, in case a pulse current is applied to the DC ammeter for speed indication, that the number of pulses by which a vibration of the needle pointer in the DC ammeter can be minimized is F and the minimum speed to be indicated is S, the following is obtained:

$$n > \frac{3600}{637} \cdot \frac{F(C/S)}{S(\text{km/hr.})}$$

wherein the number of 3600 means an hour expressed in seconds and the number of 637 is a rotation frequency of the shaft in driving at a speed of 60 km/hr. which is a value of a limit of speed prescribed in Japanese Industrial Standards. The value is, of course, varied depending upon the Standards in each country. The practical minimum driving speed S is, in ordinary circumstances, 10km/hr. (it has no need to indicate a speed lower than the above mentioned speed). At the time of 10km/hr driving, the number of pulses F by which a vibration of the needle pointer in the DC ammeter is minimized is known to be 10 (C/S) as a result of experiments. Accordingly, since the calculation of the number of pulses $n$ gives 5.65, it is necessary to produce six pulses or more in the course of one rotation of the rotor 5.

Thus, in order to obtain six pulses, four combinations of reed switches and magnets are possible, namely, six reed switches with one magnet, one reed switch with six magnets, two reed switches with three magnets and three reed switches with two magnets. In fact, however, it is not preferable to employ six or three reed switches for the economic reason that a reed switch is more expensive than a magnet. Nor is it preferable to employ a combination of six magnets with one reed switch, in respect of the durability of reed switch. This is so because with such combination the reed switch is forced to operate six times for one rotation of the rotor 5. Further it is undesirable to put six magnets in the small rotor 5 because the magnets are located too close to one another as seen in FIG. 5. When all the magnets are arranged in the same direction with regard to the magnetic fields, the magnetic flux is distributed to keep the reed switch always closed, thus it being difficult to open the reed switch. To the contrary, when the magnets are arranged as shown in FIG. 5 (b), the magnetic flux is short-circuited between one another to reduce magnetic flux for operating the reed switch, thus making it difficult to close the switch. Therefore, as a matter of fact, a large number of magnets can hardly be provided in the small rotor 5. Consequently, the employment of one reed switch is almost impossible or disadvantageous in view of a considerably large diameter of the rotor 5 required for such arrangement as employs six magnets.

Hence, it is most desirable to employ two reed switches and three magnets in respect of economy, durability or size.

Then, assuming the number of the reed switches R is two, the following is obtained from the abovementioned formula :

$$\theta = \frac{2\gamma R}{n} = \frac{2\pi \times 2}{6} = \frac{2\pi}{3} = 120°$$

$$\alpha \frac{2\pi}{n}(1+kR) = \frac{2\pi}{6}(1+2K) = 60°(1+2K)$$

wherein K is 0 or $(n/R - 1)$, and on the other hand, $(n/R - 1) = 2$; hence $K = 0$, 1 or 2.

And now, since $\alpha = 60° (1 + 2K)$, it follows that $\alpha = 60°, 180°$ or $300°$ Further, $\gamma < (2\pi)/n = (2\pi)/6 = 60°$ Such relation as mentioned above can best be seen in FIGS. 3 and 4. Stated illustratively, since the respective central angles defined by any two of the magnets adjacent to each other are 120°, the two reed switches can be arranged in any of the manners of four kinds; that is, the reed switches are positioned in 4 and $4_1$ at a central angle of 180°, in 4 and $4_1'$ at a central angle of 60°, and in 4 and $4_1''$ at a central angle of 300°.

The above-mentioned explanation is given for the embodiment of which six pulses are obtained by one rotation of the rotor. The number of pulses is not limited to six but must be at least six. The more the number of the pulses, the more desirable is it for the speed indication. However, in view of actual size of the detecting device and the, time constant of pulse producing circuit or accuracy required for speed meter, the number of reed switches 4 to be employed is preferably in the range of two to twelve.

In order to obtain at least six pulses by one rotation of the rotor most economically by the reduced size of the device, it should essentially be so constructed that $n/R$ pieces of the magnets 7, $7_1$ . . . and 7 $n/R$ are provided in the rotor 5 at the interval of a central angle of $(2\pi R)\ n$ radian and two or more reed switches 4, $4_1$ . . . $4_R$ are provided in the stator 3, said reed switches 4, $4_1$ . . . $4_R$, being connected in parallel.

The angle of rotation $\gamma$ by which one of the magnets moves from a reed switch operating position to the subsequent reed switch operating position must be as follows:

$$0 < \gamma < (2\pi)/n$$

Referring now to FIG. 6, there is illustrated, a driving distance detecting device for vehicles which comprises a reduction gear system having a rotary shaft connected to an output rotary shaft to transmit a rotation of a wheel and adapted to reduce rotation frequency properly, a stator having a reed switch, and a rotor having a magnet, rotatably inserted in said stator and adapted to be rotated at a frequency reduced by said reduction gear system and has one magnet, said magnet being adapted to effect the make-and-break operation of said reed switch once per a unit driving distance to produce one pulse for operating an integrating means, thereby indicating an integrated driving distance of an automobile.

11 is a cylindrical housing which has at its one end an opening and, at the other end thereof, a projecting pipe 11a for receiving an output rotary shaft to transmit the rotation of a wheel. A bearing 12 is fitted to the projecting pipe 11a.

13 is a cover member which has a projection 13a engaging with the opening of the housing 11 and has a bearing 14 inserted in its central portion. 15 is a stator which has a reed switch 16 provided therein and is encased by the housing 11. 17 is a rotor which is rotatably inserted in the stator 15 and has a magnet 18 provided near its periphery. Said rotor has a shaft 17a received, at one end thereof, by the bearing 14. The shaft 17a engages at the other end thereof with a spur gear 19.

20 is an intermediate disc into which is inserted a bearing 21 to receive the other end of the shaft 17a of the rotor 17 and which is connected to the side surface of the stator 15. Into said intermediate disc 20 is inserted a rotary shaft 24 having a spur gear 22 which is in mesh with the spur gear 19 fixed on the shaft 17a and a worm 23 which is in mesh with a worm 29 respectively on the opposite side of said intermediate disc 20.

25 is a base disc which is combined with said intermediate disc 20 through the medium of three spacers 26. The base disc 25 is, further, connected to the side surface of the stator 15 by means of three screws 27 through the medium of the intermediate disc 20. Said base disc 25 has a small hole 25a for receiving one end of said rotary shaft 24 and a channel-shaped bearing plate 28 fixed on the surface thereof facing said intermediate disc 20. This bearing plate 28 receives a rotary shaft 31. To the shaft 31 are fixed a worm 29 which is in mesh with the worm 23 of said rotary shaft 24 and a worm 30 which is in mesh with a worm 33. The base disc 25 has at its central portion a hole 25b into which a worm 33 is inserted.

32 is a rotary shaft to which is fixed a worm 33 meshed with the worm 30 of the rotatary shaft 31. One end of the shaft 32 is received by the bearing 21 of the intermediate disc 20 and the other end thereof is received by the bearing 12 of the housing 11. 34 is an input shaft removably inserted into the rotary shaft 32 and connected to a connecting portion of a transmission, which connecting portion is used for connecting a flexible wire in the conventional autometer.

In an ordinary automobile, the shaft, to which conventionally the flexible wire is connected, rotates 637 times when the automobile runs 1km.at $60^{km}$/hr. Accordingly, in order to indicate integratingly a driving distance in the unit of 100m, the reduction ratio of the reduction gear system is determined to be 1/63.7. For the above-mentioned shaft rotates 63.7 times per 100m of a driving distance and the rotor 7 rotates once per 100m with said reduction ratio to indicate a driving distance of 100m. In the instant embodiment, the worms 33,30,29 and 23 have respectively two grooves, thirteen teeth, two grooves and fourteen teeth, and the spur gears 22 and 15 have respectively 15 and 19 teeth, thus the rotation frequency of the shaft 17a of the rotor 17 being reduced at a ratio of 1/63.7.

In operation, since the input shaft 34 rotates in proportion to the rotation of the wheel, one rotation of the shaft 17a is effected every 63.7 times rotation of the input shaft 34, by means of the reduction gear system with the above-mentioned reduction gear ratio. Accordingly, the reed switch 16 of the stator 15 is effected by the magnet 18 of the rotor 17 overy rotation of the shaft 17a. Subsequently, a suitable counter, for example, an electromagnetic counter is operated to count one and indicate a driving distance of 100m.

Though in the above-mentioned embodiment the reduction ratio is determined to be 1/63.7 and the reed switch 16 is effected every 100m, the indication by the optionally selected unit distance such as 10m, 50m, 500m, etc. can be effected by changing accordingly the reduction gear ratio.

Referring now to FIG. 7 and 8, there is illustrated a driving speed and driving distance detecting device which comprises a stator having two or more reed swiches connected electrically in parallel, a speed detecting rotor rotatably inserted in said stator, connected to the output rotary shaft for transmitting a wheel rotation and having a magnet near the periphery thereof, said magnet being adapted to effect the make-and-break operation of said reed switch according to the rotation of said rotor to produce six or more pulses by one rotation of the rotor, a reduction gear system comprising the shaft of said rotor and adapted to reduce a rotation frequency another stator having a reed switch, a distance detecting rotor having a magnet provided therein rotatably inserted in said stator and adapted to rotate at a reduced frequency by said reduction gear system, said magnet of the distance detacing rotor being adapted to effect the make-and-break operation of said reed switch of said another stator once per a unit driving distance to produce one pulse, and a housing to encase all above-mentioned components.

41 is a cylindrical housing which has at its one end opening and, at the other end thereof, a projecting pipe 41a to receive an output rotating shaft for transmitting a wheel rotation.

A bearing 42 is fitted to the base portion of this projecting pipe 41a.

43 is a cover member which has a projection 43a engaging with the opening of the housing 41 and also has a bearing 44 inserted in the central portion thereof. 45 is a driving distance detecting stator which has a reed switch 46 provied therein and is encased by the housing 41. 47 is a rotor which is rotatably inserted in the stator 45 and has a magnet 48 provided near its periphery. Said rotor 47 has a shaft 47a received, at one end thereof, by the bearing metal 44. The shaft 47a engages at the other end thereof with a spur gear 49.

50 is an intermediate disc into which is inserted a bearing 51 to receive the other end of the shaft 47a of the rotor 47 and which is connected to the side surface of the stator 45. Into said intermediate disc 50 is inserted a rotary shaft 54. The shaft 54 has a spur gear 52 which is in mesh with the spur gear 49 fixed on the shaft 47a and a worm 53 which is in mesh with a worm 58, respectively on the opposite side of said intermediate disc 50.

55 is a base disc which is combined with said intermediate disc 50 through the medium of three spacers 56 and has a small hole 55a for receiving one end of said rotary shaft 54. Said disc 55 also has a channel-shaped bearing plate 57 fixed on the surface thereof facing said intermediate disc 50. This bearing plate 57 receives a rotary shaft 60 to which are fixed a worm 58 meshed with the worm 53 mounted on the rotary shaft 54 and a worm 59 meshed with a worm 66. The base disc 55 has at its central portion a hole 55b into which is inserted a worm 66.

61 is a speed detecting stator which is connected with said base disc 55 and fixedly connected to a driving distance detecting stator 45 by means of three screws 62 through the medium of the base disc 55, the spacers 56 and the intermediate disc 50. In said stator 61, two reed switches 63 are provided at the interval of a central angle of 60°. 64 is a rotor rotatably inserted in said stator 61, which has three magnets 65 at the interval of a central angle of 120°. To the shaft of this rotor 64 is fixed a worm 66 meshed with a worm 59 fitted on the base disc 55. One end of the shaft 64a is received by the bearing 42 of the housing 41. 67 is an input shaft removably inserted into the shaft 64a and connected to a connecting portion of a transmission, which connecting portion is used for connecting a flexible wire in the conventional autometer.

Thus, the rotation of the input shaft 67 proportional to the wheel rotation causes the rotor 64 to rotate and the reed switches 63 are operated by the magnets provided in said rotor 64. This make-and-break operation of the switches produces rectangular pulses, which are integrated in an electrical circuit (not shown) and applied to a movable coil type DC ammeter. A differential wave-form is integrated by the inertia of said ammeter to indicate a driving speed. On the other hand, as the worm 66 fixed on the shaft 64a rotates according to the rotation of the rotor 64, the rotor 47 is rotated through the medium of the worms 59, 58 and 53 and the gears 52 and 49. The rotation of the rotor 47 causes a make-and-break operation of the reed switch 46 by the magnet 48 provided in said rotor. Subsequently, a suitable counter, for instance, an electromagnetic counter is operated by this make-and-break operation to indicate a driving distance.

The above-mentioned third is such is such a device that reed switches 63 are provided in the stator 61 each at the interval of a central angle of 60° to obtain six pulses. As explained in the first embodiment, however, the device may be so designed that $n/R$ pieces of the magnet 65 are provided in the rotor 64 each at the interval of a central angle of $(2\pi R)/n$, and $R$ (two or more) pieces of the reed switch 61 are provided in the rotor 64 and connected in parallel to obtain n pieces of pulse every rotation of the rotor. And, the angle of rotation $\gamma$ by which one magnet moves from a reed switch operating position to the subsequent reed switch operating position is given as follows:

$$0 < \gamma < (2\pi)/n$$

In any of the above-mentioned embodiments, a make-and-break load current may be applied in substantially minimized load condition to prevent the deterioration of the reed switches, or an adequate protective circuit (wherein either a diode connected in series to a condenser or a resistor connected in series to a condenser is connected in parallel to a reed switch; or a resistor is connected in parallel to a load of a reed switch) may be additionally employed to prevent a damage of a contact surface.

As described, according to this invention, a precise indication is obtained even at a lower-speed driving because the present device is so devised that two or more reed switches provided in a stator cooperates with the magnet provided in a rotor to produce at least six pulses, which actuate a needle pointer of a DC ammeter to indicate a driving speed exactly.

It is to be noted that since two or more reed switches are employed, the frequency of the make-and-break operation of a reed switch can be reduced to lengthen its life. The reliability is improved because a pulse of desired amplitude can be obtained, according to this invention. Not only can the device be small-sized and manufactured economically but also the life span thereof can be extended because the detection of both speed and distance can be carried out without a flexible wire which often causes various troubles.

What is claimed is:

1. In a vehicular driving speed detecting device adapted for driving interconnection to a vehicle wheel, comprising a stator, a rotor drivingly interconnected to said wheel and rotatably positioned within said stator, and means coacting between the stator and the rotor for effecting the generation of at least six equal interval electrical pulses during one revolution of the rotor relative to the stator, said means including R reed switches mounted on the stator and connected electrically in parallel, wherein R represents an integer of two or more, at the interval of a central angle of $(2\pi/n)(1 + KR)$ radians wherein K represents zero or a natural number of $(n/R - 1)$ or less, and said means further including $n/R$ magnets mounted on the rotor near the periphery thereof at the interval of a central angle of $(2\pi R)$ n, thereby enabling the number of equal interval pulses n obtained by one rotation of the rotor to be six or more.

2. A device as claimed in claim 1, wherein the number of pulses is 24 or less.

3. A device as claimed in claim 2, wherein the number of reed switches is in the range of two to twelve.

4. In a speed and distance detecting device adapted for connection to a vehicle having a transmission including a drive portion, comprising an input shaft connected to said drive portion of said transmission, a first ring-like stator having two or more angularly spaced reed switches connected electrically in parallel, a speed detecting rotor concentric with and rotatably inserted in said first stator and drivingly connected to the input shaft, said speed detecting rotor having a plurality of angularly spaced magnets near the periphery thereof, said magnets being adapted to effect the make-and-break operation of said reed switches on said first stator according to the rotation of said rotor to produce six or more pulses by one rotation of the speed detecting rotor, a second ring-like stator fixedly connected to and coaxially aligned with said first stator and having a single reed switch mounted thereon, a distance detecting rotor coaxial with said speed detecting rotor and having a magnet provided therein, said distance detecting rotor being concentric with and rotatably inserted in said second stator, and a reduction gear means drivingly connected between said two rotors whereby said magnet of the distance detecting rotor effects the make-and-break operation of said reed switch of said second stator once per unit driving distance, and a housing encasing all of said above mentioned components.

5. A device according to claim 1, wherein said reed switches each include a pair of elongated relatively movable reed elements positioned adjacent one another and extending in a direction substantially parallel to the axial direction of said rotor.

6. A device according to claim 4, wherein said reed switches each include a pair of elongated relatively movable reed elements positioned adjacent one another and extending in a direction substantially parallel to the axial direction of said rotor.

* * * * *